United States Patent [19]

Dockery

[11] Patent Number: 5,165,867
[45] Date of Patent: Nov. 24, 1992

[54] FUEL PUMP MOUNTING

[75] Inventor: Randall L. Dockery, Flushing, Mich.

[73] Assignee: General Motors Corporation, Detroit, Mich.

[21] Appl. No.: 841,176

[22] Filed: Feb. 25, 1992

[51] Int. Cl.$^5$ .............................................. F04B 17/00
[52] U.S. Cl. .................................. 417/360; 417/363; 417/423.3; 417/423.15
[58] Field of Search ............... 417/360, 363, 423.1, 417/423.3, 423.9, 423.14, 423.15

[56] References Cited

U.S. PATENT DOCUMENTS

| | | | |
|---|---|---|---|
| Re. 24,909 | 12/1960 | Dochterman | 417/423.3 |
| 3,269,322 | 8/1966 | Lotspih | 417/423.3 |
| 3,910,464 | 10/1975 | Schlanzky | 222/180 |
| 4,590,964 | 5/1986 | Beardmore | 137/565 |
| 4,716,931 | 1/1988 | Shibamoto | 417/360 |
| 4,961,693 | 10/1990 | Hoover et al. | 417/363 |
| 4,964,787 | 10/1990 | Hoover | 417/363 |
| 5,002,467 | 3/1991 | Talaski et al. | 417/363 |
| 5,020,978 | 6/1991 | Nashif | 417/363 |

Primary Examiner—Richard A. Bertsch
Assistant Examiner—Charles G. Freay
Attorney, Agent, or Firm—Saul Schwartz

[57] ABSTRACT

A mounting for an electric fuel pump on a rigid metal return fuel conduit in a fuel tank of an automobile includes a plastic support having a center body with a stepped bore therein for receiving the lower end of the return fuel conduit and a pair of integral flexible arms extending in opposite directions from the center body. The return fuel conduit has an annular shoulder which engages a shoulder on the center body to limit penetration of the return fuel conduit into the bore. The return fuel conduit also has a plurality of lugs thereon permanently deformed into notches in the center body to capture the center body between the lugs and the shoulder on the return fuel conduit. The flexible arms have wrapped positions around the fuel pump and an annular rubber isolator thereon clamping the fuel pump and the isolator to the center body. A buoyant valve element in a valve chamber in the center body is biased by its buoyancy to a seated position preventing backflow of fuel from the fuel tank into the return fuel conduit.

4 Claims, 3 Drawing Sheets

FUEL PUMP MOUNTING

FIELD OF THE INVENTION

This invention relates to mountings for electric fuel pumps in automobile fuel tanks.

BACKGROUND OF THE INVENTION

It is common practice to mount an electric fuel pump on a bracket inside an automobile fuel tank with a vibration isolating bushing between the pump and bracket. It has also been proposed to clamp a plastic cage to the lower end of a return fuel conduit in an automobile fuel tank and to mount an electric fuel pump in the cage with springs or other vibration isolating elements between the pump and the cage. In some proposals, the cages may be disassembled to remove and replace the pump. In other proposals, the cages have access openings for installing and removing the pump without disassembling the cage. An electric fuel pump mounting according to this invention is a novel alternative to the aforesaid bracket-type and cage-type fuel pump mountings.

SUMMARY OF THE INVENTION

This invention is a new and improved mounting for an electric fuel pump in a fuel tank of an automobile on a return fuel conduit in the tank. The fuel pump mounting according to this invention includes a plastic support having a center body, a shelf on the center body, and a pair of integral flexible arms. The lower end of the return fuel conduit penetrates a bore in the center body until a shoulder on the conduit engages a shoulder on the center body. The lower end of the return fuel conduit is locally permanently deformed into notches in the center body to define lugs which prevent dislodgment of the support from and rotation of the support relative to the lower end of the return fuel conduit. The fuel pump seats on the shelf and the flexible arms envelope the pump with an annular rubber isolator between the pump and the support. Latch elements on the distal ends of the flexible arms releasably clamp the pump to the support. The center body may further include a valve chamber below the lower end of the return fuel conduit, a valve seat in the valve chamber, and a buoyant valve element in the valve chamber operative to seal against the valve seat to prevent backflow of fuel through the return fuel conduit.

DESCRIPTION OF A PREFERRED EMBODIMENT

Figure 1:
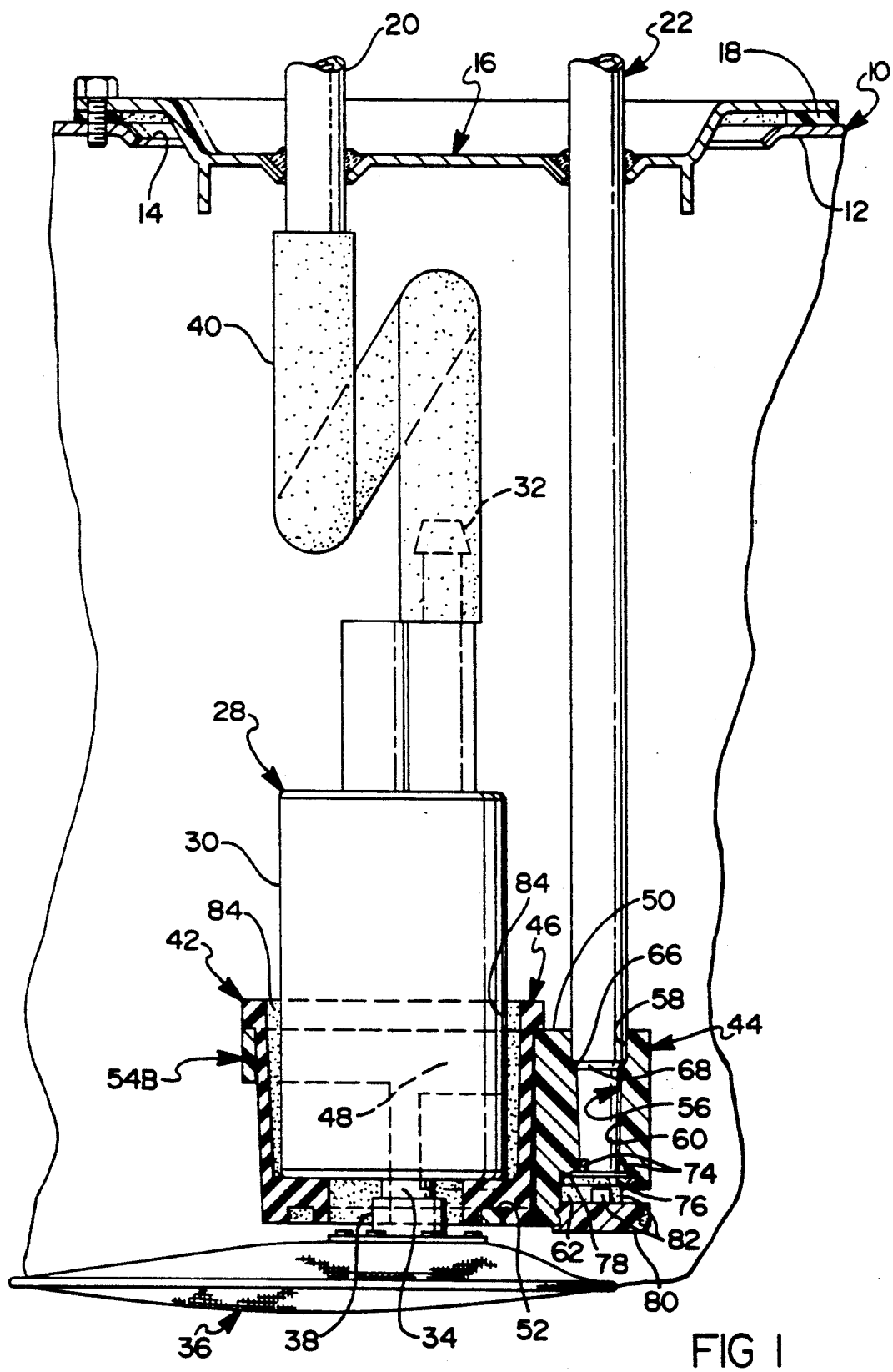
FIG. 1 is a fragmentary elevational view, partly in section, of an automotive fuel tank having an electric fuel pump supported therein by a fuel pump mounting according to this invention.
Figure 2:
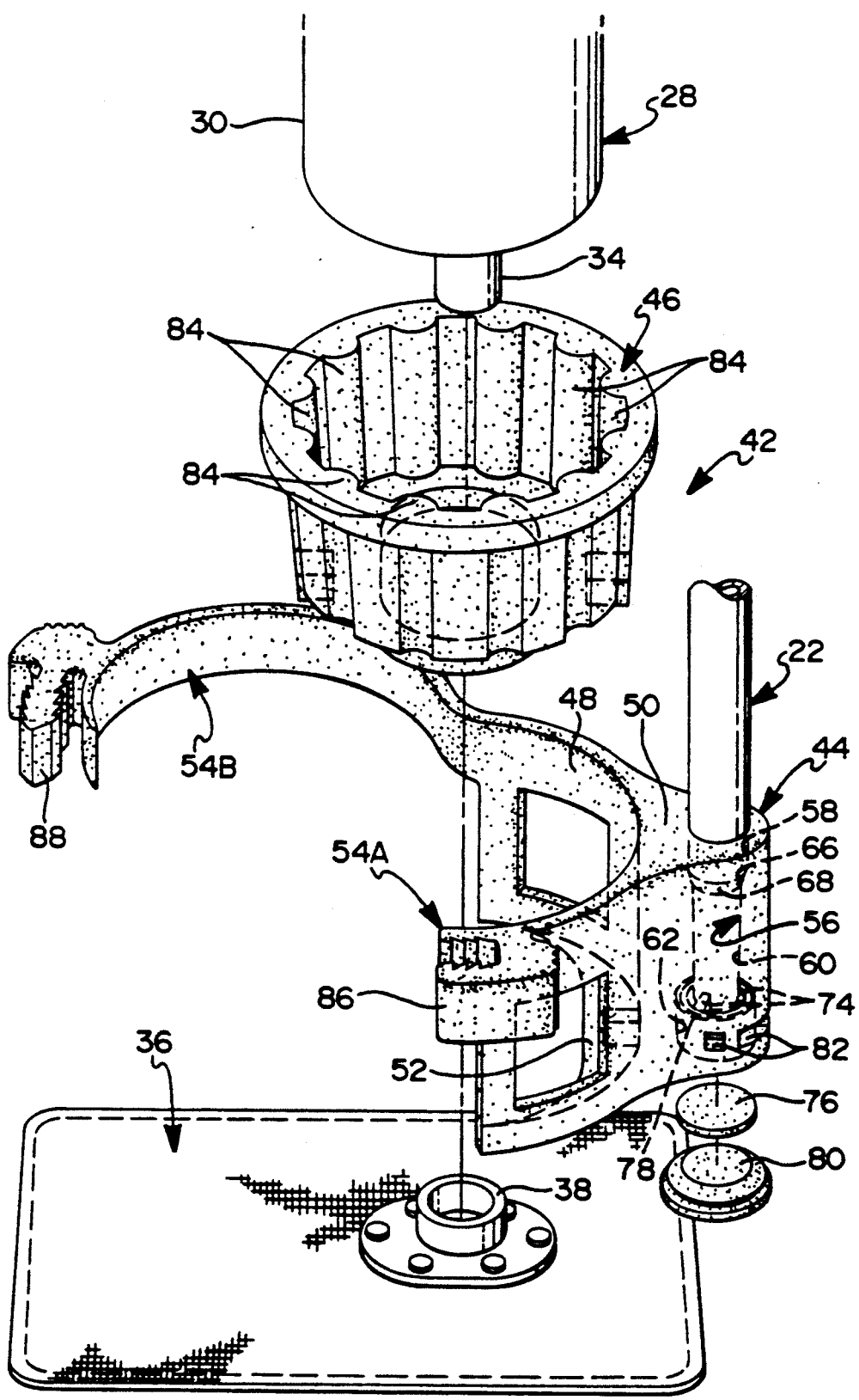
FIG. 2 is an exploded perspective view of the fuel pump mounting according to this invention.

Referring to FIG. 1, a fragmentarily illustrated automotive fuel tank (10) includes an upper wall (12) having an access port (14) therein. The access port is closed and sealed by a cover (16) and a gasket seal (18). A high pressure connector (20) and a return fuel conduit (22) traverse the cover (16) and are sealed against leakage by crimping and soldering. The return fuel conduit is made of rigid but readily deformable metal such as aluminum tube. Hoses, not shown, outside the fuel tank define a high pressure circuit between the connector (20) and a fuel rail of a fuel injection system on an engine of the vehicle and a low pressure circuit between the fuel rail and return fuel conduit (22).

An electric fuel pump (28) in the fuel tank includes a cylindrical housing (30), a discharge (32) at one end of the housing, an inlet (34) at the other end of the housing, and a screen (36) with a neck (38) over the inlet. The pump may be as described in U.S. Pat. No. 4,718,827, issued Jan. 12, 1988 and assigned to the assignee of this invention. A flexible, high pressure hose (40) is disposed between the discharge (32) and the connector (20) and conducts fuel under pressure from the pump to the aforesaid high pressure circuit. The pump (28) is supported low in the fuel tank (10) on the return fuel conduit (22) by a fuel pump mounting (42) according to this invention.

The fuel pump mounting (42) includes a plastic support (44) and an annular rubber isolator (46). The support (44) has an annular wall segment (48) integral with a center body (50), an integral shelf (52) at the lower end of the wall segment, and a pair of flexible arms (54A-B) integral with and extending in opposite directions from the sides of the wall segment. The wall segment (48) and the shelf (52) may be solid or, as illustrated, perforated for purposes not germane to this invention.

The center body (50) has a stepped bore (56) therein which is received over the return fuel conduit (22) in the fuel tank. The stepped bore has a large diameter part (58) opening through the top of the center body (50), a small diameter part (60) opening into a valve chamber (62) in the center body through a wall (64) of the valve chamber, and a shoulder (66) between the large and small diameter parts. Penetration of the return fuel conduit into the stepped bore (56) is limited by engagement of the shoulder (66) in the bore on an abutment on the return fuel conduit defined by a corresponding annular shoulder (68) on the return fuel conduit which shoulders cooperate to align a lower end (70), FIG. 3, of the return fuel conduit (22) with the plane of wall (64) of the valve chamber (62).

Figure 3:
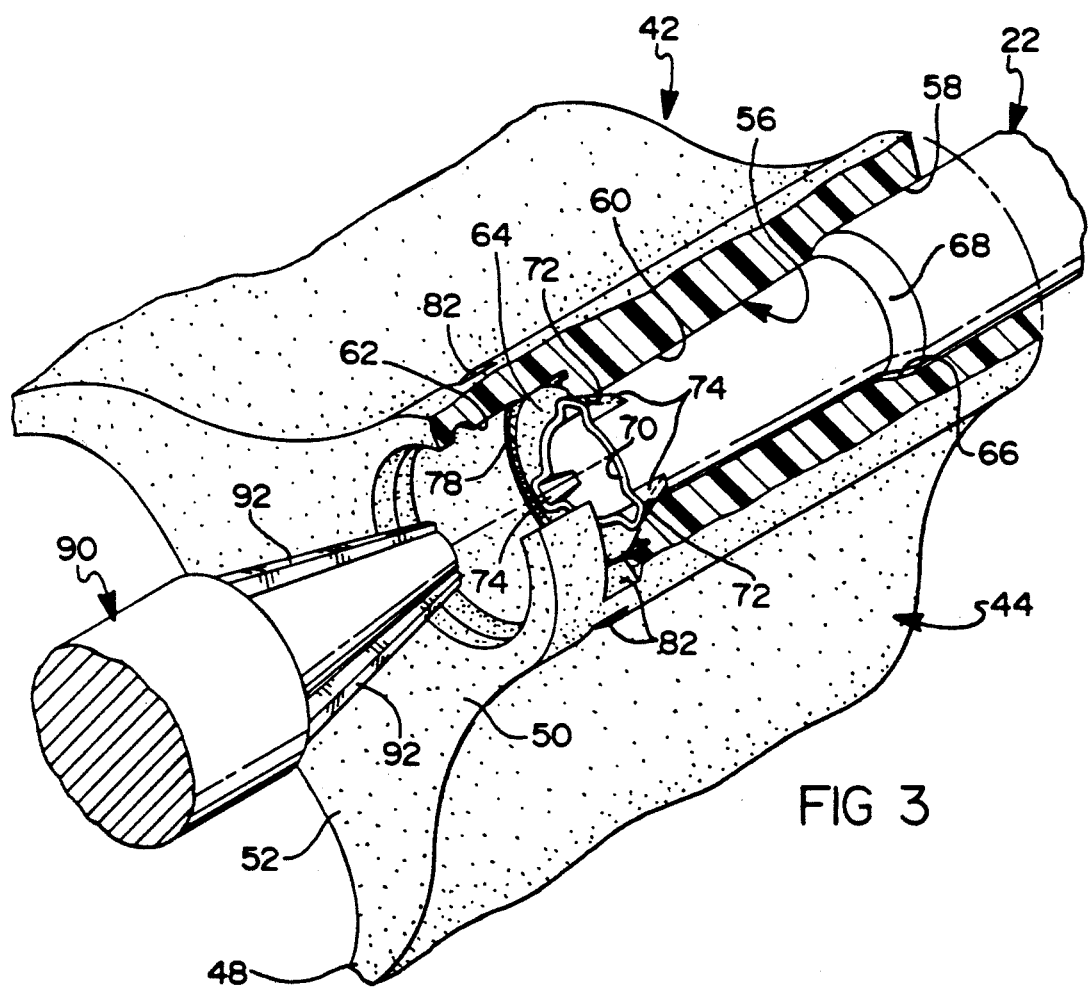
FIG. 3 is a fragmentary perspective view of the fuel pump mounting according to this invention.

The center body (50) has a plurality of notches (72), FIG. 3, in the wall (64) of the valve chamber (62) around the small diameter part (60) of the stepped bore. The lower end (70) of the return fuel conduit is locally flared or otherwise permanently deformed to define a plurality of lugs (74) in the notches (72) which lugs rigidly clamp the center body against the shoulder (68) on the return fuel conduit and prevent dislodgment of the return fuel conduit from the stepped bore (56). The lugs (74) also prevent rotation of the support (44) relative to the return fuel conduit about the longitudinal centerline of the latter.

A buoyant, disc-shaped anti-siphon valve element (76) is disposed in the valve chamber (62). The valve element has a seated position, FIG. 1, against a raised, annular seat (78) on the wall (64) of the valve chamber, FIGS. 1 and 3, around the lower end of the return fuel conduit and an unseated position, not shown, remote from the seat (78). The valve element (76) is captured in the valve chamber (62) by a cap (80) which snaps into an open end of the valve chamber. The valve chamber (62) is open to the fuel tank (10) through a plurality of windows (82) in the center body (50) of the support.

The annular rubber isolator (46) has a plurality of internal longitudinal ribs (84), FIG. 1, which grip the cylindrical housing (30) of the fuel pump when the isolator is stretched over the lower end of the housing. The isolator seats on the shelf (52) for vertical support of the pump (28) on the center body (50). The flexible arms (54A-B) have wrapped positions, FIG. 1, encircling the isolator and are releasably maintained in the wrapped position by a latch which includes a socket (86) one arm and a tongue (88) on the other arm. The socket and tongue have serrated sides for preventing unintended dislodgment of the tongue from the socket. In their wrapped positions the flexible arms clamp the fuel pump (28) to the support (44) with the rubber isolator therebetween for vibration damping and with sufficient compression to prevent rotation of the fuel pump housing (30) relative to the support. The flexible arms may vertically support the fuel pump without the shelf (52) in other embodiments of this invention.

In operation, a fraction of the fuel pumped by the pump (28) from the fuel tank recirculates back to the tank at low pressure through the return fuel conduit (22). The return fuel issues through the lower end (70) of the return fuel conduit into the valve chamber (62), displaces the buoyant valve element (76) from its seated position, and flows from the valve chamber into the fuel tank through the windows (82). When the fuel pump is off, return flow ceases and the buoyancy of the valve element (76) moves the latter to its seated position against the valve seat (78) to prevent backflow of fuel from the tank through the return fuel conduit.

It is contemplated that the support (44) is assembled to the return fuel conduit (22) in a fixture, not shown, which defines a predetermined angular orientation of the center body (50) relative to the return fuel conduit and the cover (16). In that circumstance, the pump (28) may be mounted in predetermined relationship to the fuel tank by simply orienting the cover (16) in predetermined relationship to the upper wall (12) of the fuel tank.

A simple method of forming the lugs (74) in the notches (72) is illustrated in FIG. 3. With the cap (80) removed, a conical tool (90) having a plurality of raised lands (92) is indexed such that the lands (92) are aligned with corresponding ones of the notches (72) in the center body (50). The tool is then forced into the lower end (70) of the return fuel conduit so that the lands (92) locally flare the return fuel conduit to define the lugs (74) in the notches (72).

The embodiments of the invention in which an exclusive property or privilege is claimed are defined as follows:

1. In an automotive fuel tank having a rigid metal return fuel conduit supported vertically in said tank and an electric fuel pump in said tank,
a fuel pump mounting comprising:
a plastic support including a center body having a bore therein receiving a lower end of said return fuel conduit,
shoulder means on said return fuel conduit defining an abutment engageable on said center body to limit penetration of said return fuel conduit into said bore in said center body,
lug means on said return fuel conduit engageable in notch means on said center body so that said center body is captured between said lug means and said shoulder means to prevent dislodgment of said return fuel conduit from said bore in said center body and to prevent rotation of said center body relative to said return fuel conduit about a longitudinal centerline of said return fuel conduit,
an annular elastomeric isolator around said electric fuel pump,
means defining a pair of integral flexible arms on said center body each having a wrapped position in which said flexible arms envelop and clamp said elastomeric isolator and said electric fuel pump to said center body, and
latch means on each of said flexible arms releasably connecting said flexible arms in said wrapped positions thereof.

2. The fuel pump mounting recited in claim 1 wherein said notch means on said center body includes a plurality of notches in said center body open to said bore in said center body, and
said lug means on said return fuel conduit includes a plurality of integral lugs on said return fuel conduit permanently deformed into respective ones of said notches in said center body.

3. The fuel pump mounting recited in claim 2 further including:
means on said center body defining an integral shelf for vertical support of said electric fuel pump.

4. The fuel pump mounting recited in claim 3 further including:
means defining a valve chamber in said center body into which said bore in said center body opens,
window means in said center body between said valve chamber and said fuel tank permitting fuel flow between said valve chamber and said fuel tank,
means defining a valve seat in said valve chamber around said opening of said bore into said valve chamber, and
a buoyant valve element in said valve chamber biased by the buoyancy thereof to a seated position on said valve seat preventing backflow of fuel from said valve chamber into said return fuel conduit.

* * * * *